US011804131B2

(12) United States Patent
Vijaya Kumar et al.

(10) Patent No.: US 11,804,131 B2
(45) Date of Patent: Oct. 31, 2023

(54) COMMUNICATION SYSTEM FOR DETERMINING VEHICLE CONTEXT AND INTENT OF A TARGET VEHICLE BASED ON PERCEIVED LANE OF TRAVEL

(71) Applicant: GM Global Technology Operations LLC, Detroit, MI (US)

(72) Inventors: Vivek Vijaya Kumar, Shelby Township, MI (US); Bo Yu, Troy, MI (US); Hariharan Krishnan, Troy, MI (US); Kamran Ali, Troy, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 114 days.

(21) Appl. No.: 17/534,721

(22) Filed: Nov. 24, 2021

(65) Prior Publication Data

US 2023/0162602 A1    May 25, 2023

(51) Int. Cl.
*G08G 1/0967* (2006.01)
*G08G 1/01* (2006.01)
*B60W 60/00* (2020.01)
*G06V 20/54* (2022.01)
*H04W 4/44* (2018.01)

(52) U.S. Cl.
CPC ..... *G08G 1/096708* (2013.01); *B60W 60/001* (2020.02); *G06V 20/54* (2022.01); *G08G 1/0116* (2013.01); *H04W 4/44* (2018.02); *B60W 2520/06* (2013.01); *B60W 2554/4041* (2020.02); *B60W 2554/4042* (2020.02); *B60W 2554/4045* (2020.02); *B60W 2556/45* (2020.02); *G06V 2201/08* (2022.01)

(58) Field of Classification Search
CPC . G08G 1/096708; G08G 1/0116; H04W 4/44; B60W 60/001; B60W 2554/4041; B60W 2554/4042; B60W 2554/4045; B60W 2556/45; B60W 2520/06; G06V 20/54; G06V 2201/08
USPC ......................................................... 701/117
See application file for complete search history.

(56) References Cited

U.S. PATENT DOCUMENTS

| 10,268,191 | B1 * | 4/2019 | Lockwood | G05D 1/0038 |
| 11,100,802 | B2 * | 8/2021 | Moncomble | G08G 1/166 |
| 2005/0192736 | A1 * | 9/2005 | Sawada | G09B 23/00 |
| | | | | 701/117 |

(Continued)

*Primary Examiner* — Richard A Goldman
(74) *Attorney, Agent, or Firm* — Vivacqua Crane, PLLC

(57) ABSTRACT

A communication system that determines a context and an intent of a specific remote vehicle located in a surrounding environment of a host vehicle includes one or more controllers for receiving sensed perception data including sensed perception data. The one or more controllers execute instructions to determine a plurality of vehicle parameters related to the specific remote vehicle. The the one or more controllers execute instructions to associate the specific remote vehicle with a specific lane of travel of a roadway based on map data. The one or more controllers determines possible maneuvers, possible egress lanes, and a speed limit for the specific remote vehicle for the specific lane of travel based on the map data, and determines the context and the intent of the specific remote vehicle based on the plurality of vehicle parameters, the possible maneuvers, the possible egress lanes for the specific remote vehicle, and the speed limit related to the specific remote vehicle.

20 Claims, 7 Drawing Sheets

(56) References Cited

U.S. PATENT DOCUMENTS

| | | | |
|---|---|---|---|
| 2013/0002871 A1* | 1/2013 | Natroshvili | G06T 7/80 |
| | | | 348/148 |
| 2013/0261872 A1* | 10/2013 | Ferguson | B60W 30/16 |
| | | | 701/28 |
| 2015/0086080 A1* | 3/2015 | Stein | H04N 7/183 |
| | | | 382/104 |
| 2015/0241878 A1* | 8/2015 | Crombez | B60W 30/143 |
| | | | 701/23 |
| 2016/0375904 A1* | 12/2016 | Satzoda | G06F 18/24 |
| | | | 348/148 |
| 2017/0185854 A1* | 6/2017 | Lai | G06V 20/582 |
| 2017/0240176 A1* | 8/2017 | Aoki | B60W 50/082 |
| 2017/0341652 A1* | 11/2017 | Sugawara | G08G 1/166 |
| 2018/0286247 A1* | 10/2018 | Fujita | B60W 10/04 |
| 2019/0322281 A1* | 10/2019 | Wang | G01C 21/3658 |
| 2019/0333373 A1* | 10/2019 | Fang | G08G 1/096775 |
| 2019/0392308 A1* | 12/2019 | Bhatnagar | G06N 20/20 |
| 2020/0202713 A1* | 6/2020 | Gesch | G08G 1/096791 |
| 2021/0253136 A1* | 8/2021 | Yoshihara | B60W 30/0956 |
| 2021/0325197 A1* | 10/2021 | Ohmura | B60W 30/09 |
| 2022/0105961 A1* | 4/2022 | Wang | G08G 1/164 |
| 2022/0176957 A1* | 6/2022 | Tamilarasan | B60W 30/143 |

* cited by examiner

COMMUNICATION SYSTEM FOR DETERMINING VEHICLE CONTEXT AND INTENT OF A TARGET VEHICLE BASED ON PERCEIVED LANE OF TRAVEL

INTRODUCTION

The present disclosure relates to a communication system and method for determining a vehicle's context and intent based on cooperative infrastructure perception messages.

Cooperative sensor sharing involves wirelessly transmitting data collected by various sensors to neighboring host users or vehicles. Thus, a host vehicle may receive information about a sensed object from multiple neighboring users. In cooperative sensor sharing, remote vehicles and roadway infrastructure share data related to sensed objects with a host vehicle. For example, an infrastructure camera such as a red light or speed camera may capture data related to a remote vehicle, which is then transmitted to a host vehicle.

Vehicle-to-everything (V2X) is an all-encompassing term for a vehicle's connected communications and includes both vehicle-to-vehicle (V2V) and vehicle-to-infrastructure (V2X) applications that involve broadcasting messages from one entity to a host vehicle. However, if a particular vehicle is not equipped with V2X technology, then the host vehicle only receives data related to the particular vehicle's position, speed, location geometry, and heading based on cooperative sensor sharing from source such as, for example, the infrastructure camera. That is, in other words, the host vehicle does not receive information related to the particular vehicle's context, which refers to a short history of the vehicle's path, and intent, which refers to a short prediction of the vehicle's intended path.

Thus, while current vehicle connected communications achieve their intended purpose, there is a need in the art for an approach that determines a vehicle's context and intent when none is available.

SUMMARY

According to several aspects, a communication system that determines a context and an intent of a specific remote vehicle located in a surrounding environment of a host vehicle is disclosed. The communication system includes one or more controllers for receiving sensed perception data related to the specific remote vehicle. The one or more controllers execute instructions to determine a plurality of vehicle parameters related to the specific remote vehicle based on the sensed perception data. The one or more controllers associate the specific remote vehicle with a specific lane of travel of a roadway based on map data, where the map data indicates information related to lanes of travel of the roadway that the specific remote vehicle is traveling along. The one or more controllers determine possible maneuvers, possible egress lanes, and a speed limit for the specific remote vehicle for the specific lane of travel based on the map data. Finally, the one or more controllers determines the context and the intent of the specific remote vehicle based on the plurality of vehicle parameters, the possible maneuvers, the possible egress lanes for the specific remote vehicle, and the speed limit related to the specific remote vehicle.

In one aspect, a plurality of coordinate pairs based on a world coordinate system are converted into image frame coordinates for noise modeling based on a homography matrix, where the coordinate pairs represent a monitored area of the surrounding environment of the host vehicle.

In another aspect, the one or more controllers execute instructions to determine, by a Kalman filter, a plurality of error resilient vehicle parameters related to the specific remote vehicle based on a noise associated with converting noise associated with converting the coordinate pairs based on the world coordinate system into image frame coordinates.

In yet another aspect, the the one or more controllers execute instructions to divide an image representing the monitored area of the surrounding environment into a plurality of pixel bins.

In an aspect, the one or more controllers determine how many of the coordinate pairs based on the world coordinate system map to each pixel bin of the image and determine a distance covariance map and a velocity covariance map based for each pixel bin that is part of the image.

In another aspect, the the one or more controllers execute instructions to render image data that is a representation of the specific remote vehicle, and execute an object detection algorithm to detect the specific remote vehicle within the image data, where the specific remote vehicle that is detected is a detected object pixel. The one or more controllers match the detected object pixel with the velocity covariance map and the distance covariance map.

In yet another aspect, the the one or more controllers execute instructions to determine a noise associated with a bounding box based on a plurality of stationary images of the specific remote vehicle, and determine the pixel bins that are impacted by the noise associated with the bounding box. The one or more controllers calculate an average velocity covariance matrix and an average distance covariance matrix for each impacted pixel bin, and match pixels belonging to the detected object with the velocity covariance map and the distance covariance map. Finally, the one or more controllers send the world coordinates of the detected object and a matching velocity covariance and a matching distance covariance to a Kalman Filter based state tracking module.

In still another aspect, the one or more controllers execute instructions to determine when the specific remote vehicle is in a pocket lane. In response to determining the specific remote vehicle being in the pocket lane, the one or more controllers set the context as equal to a distance the specific remote vehicle traveled in the pocket lane plus a distance traveled in the adjacent lane. In response to determining the specific remote vehicle is not in the pocket lane, the one or more controllers set the context as equal to a length of a current lane of travel.

In an aspect, the the one or more controllers execute instructions to determine a type of travel allowed by a current lane of travel for the specific remote vehicle, where the type of travel includes through movement only and turns allowed. In response to determining the type of travel allowed by the current lane of travel is through movement only, the one or more controllers set the intent as a connecting egress lane having a length expressed as an intent distance.

In another aspect, the the one or more controllers execute instructions to determine a type of travel allowed by a current lane of travel for the specific remote vehicle, where the type of travel includes through movement only and turns allowed. In response to determining the current lane of travel for the specific remote vehicle allows for turns, the one or more controllers sets multiple values for the intent, where each value corresponds to a length a potential connecting egress lane.

In yet another aspect, the the one or more controllers execute instructions to determine a confidence level indicating a probability that the intent is accurate.

In still another aspect, the plurality of vehicle parameters indicate a position, speed, location geometry, and heading of the specific remote vehicle.

In one aspect, a method for determining a context and an intent of a specific remote vehicle located in a surrounding environment of a host vehicle is disclosed. The method includes receiving, by one or more controllers, sensed perception data related to the specific remote vehicle. The method includes determining, by the one or more controllers, a plurality of vehicle parameters related to the specific remote vehicle based on the cooperative infrastructure sensing message. The method also includes associating the specific remote vehicle with a specific lane of travel of a roadway based on map data, where the map data indicates information related to lanes of travel of the roadway that the specific remote vehicle is traveling along. The method further includes determining possible maneuvers, possible egress lanes, and a speed limit for the specific remote vehicle for the specific lane of travel based on the map data. Finally, the method includes determining the context and the intent of the specific remote vehicle based on the plurality of vehicle parameters, the possible maneuvers, the possible egress lanes for the specific remote vehicle, and the speed limit related to the specific remote vehicle.

In another aspect, the method includes converting a plurality of coordinate pairs based on a world coordinate system into image frame coordinates for noise modeling based on a homography matrix, where the coordinate pairs represent a monitored area of the surrounding environment of the host vehicle.

In yet another aspect, the method includes determining, by a Kalman filter, a plurality of error resilient vehicle parameters related to the specific remote vehicle based on a noise associated with converting noise associated with converting the coordinate pairs based on the world coordinate system into image frame coordinates.

In still another aspect, the method includes dividing an image representing the monitored area of the surrounding environment into a plurality of pixel bins, determining how many of the coordinate pairs based on the world coordinate system map to each pixel bin of the image, and determining a distance covariance map and a velocity covariance map based for each pixel bin that is part of the image.

In an aspect, the method includes rendering image data that is a representation of the specific remote vehicle, executing an object detection algorithm to detect the specific remote vehicle within the image data, where the specific remote vehicle that is detected is a detected object pixel, and matching the detected object pixel with the velocity covariance map and the distance covariance map.

In another aspect, the method includes determining a noise associated with a bounding box based on a plurality of stationary images of the specific remote vehicle, determining the pixel bins that are impacted by the noise associated with the bounding box, calculating an average velocity covariance matrix and an average distance covariance matrix for each impacted pixel bin, matching pixels belonging to the detected object with the velocity covariance map and the distance covariance map, and sending the world coordinates of the detected object and a matching velocity covariance and a matching distance covariance to a Kalman Filter based state tracking module.

In yet another aspect, the method includes determining when the specific remote vehicle is in a pocket lane. In response to determining the specific remote vehicle being in the pocket lane, the method includes setting the context as equal to a distance the specific remote vehicle traveled in the pocket lane plus a distance traveled in the adjacent lane. In response to determining the specific remote vehicle is not in the pocket lane, the method includes setting the context as equal to a length of a current lane of travel.

In another aspect, the method includes determining a type of travel allowed by a current lane of travel for the specific remote vehicle, where the type of travel includes through movement only and turns allowed. In response to determining the type of travel allowed by the current lane of travel is through movement only, the method includes setting the intent as a connecting egress lane having a length expressed as an intent distance.

In yet another aspect, the method includes determining a type of travel allowed by a current lane of travel for the specific remote vehicle, where the type of travel includes through movement only and turns allowed. In response to determining the current lane of travel for the specific remote vehicle allows for turns, the method includes setting multiple values for the intent, where each value corresponds to a length a potential connecting egress lane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
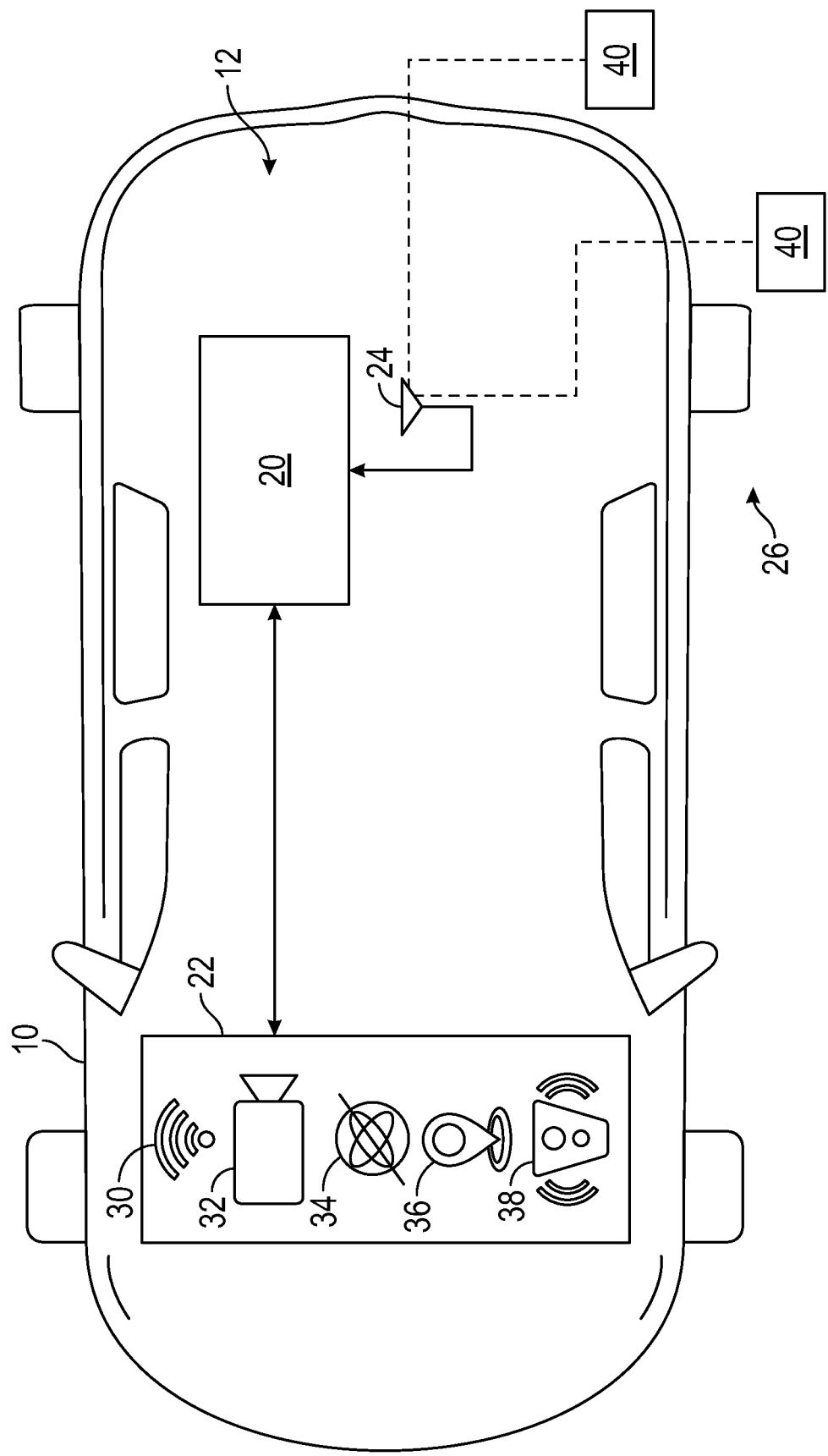
FIG. 1 is a schematic diagram of a host vehicle including a communication system for determining a context and intent of a specific remote vehicle, according to an exemplary embodiment.
Figure 2:
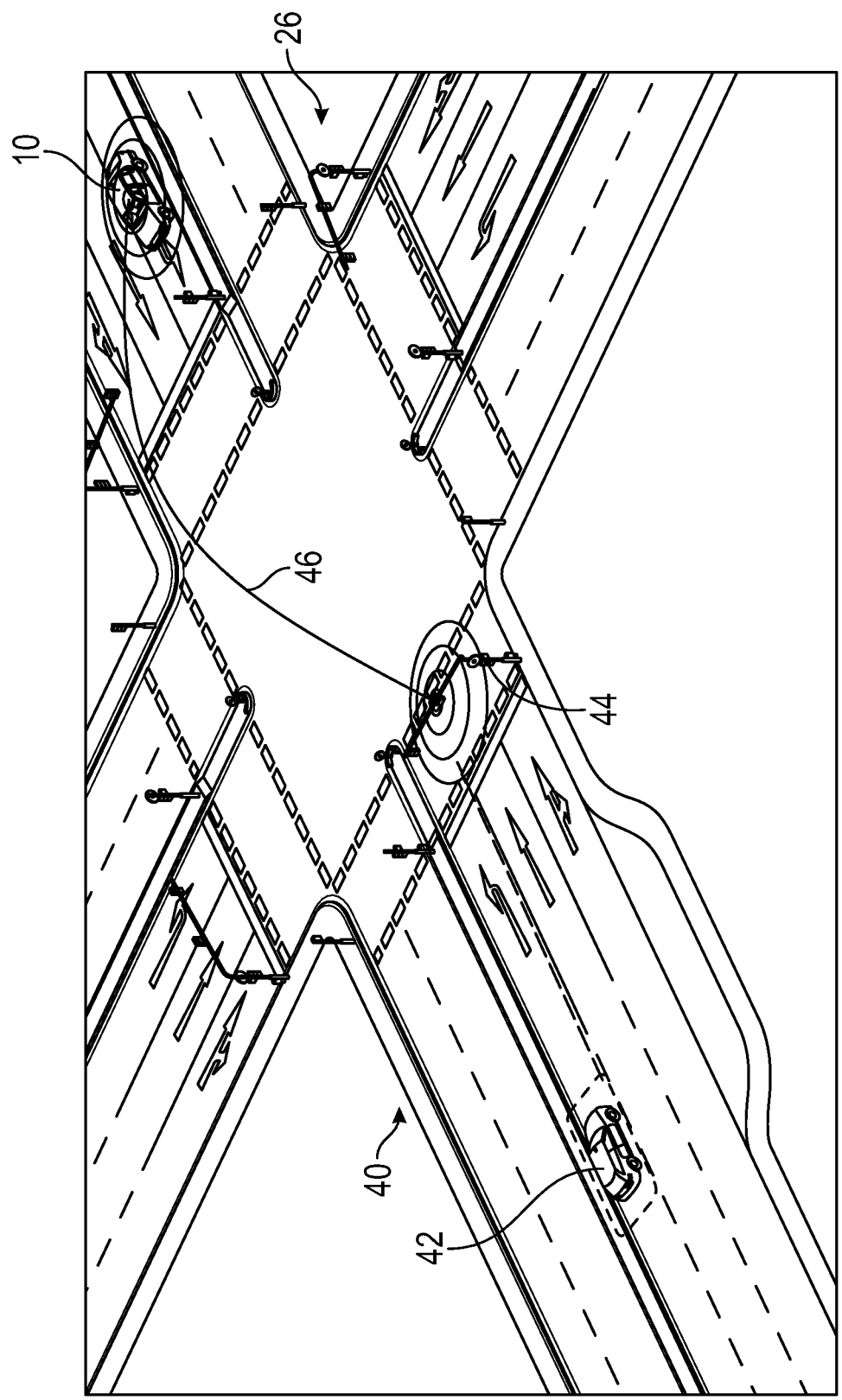
FIG. 2 is a diagram illustrating an exemplary environment where the host vehicle shown in FIG. 1 receives cooperative infrastructure sensing messages related to a specific remote vehicle, according to an exemplary embodiment.

Referring to FIG. 1, an exemplary host vehicle 10 is illustrated. The vehicle 10 is part of a communication system 12 including a controller 20 in electronic communication with a plurality of sensors 22 and one or more antennas 24. In the example as shown in FIG. 1, the plurality of sensors 22 include one or more radar sensors 30, one or more cameras 32, an inertial measurement unit (IMU) 34, a global positioning system (GPS) 36, and LiDAR 38, however, it is to be appreciated that additional sensors may be used as well. The communication system 12 also includes one or more remote objects 40 located in a surrounding environment 26 of the host vehicle 10, which is shown in FIG. 2. Referring to both FIGS. 1 and 2, in one embodiment the remote objects 40 include, but are not limited to, one or more remote vehicles 42 and remote infrastructure 44 that is based on a cooperative perception and communication system. For example, in the embodiment as shown in FIG. 2, the remote infrastructure 44 includes infrastructure cameras such as red light cameras as well as processor and communication modules (not shown). The controller 20 of the communication system 12 receives cooperative infrastructure sensing messages 46 related to a specific remote vehicle 42 based on vehicle-to-infrastructure (V2X). However, it is to be appreciated that the controller 20 of the communication system 12 may also receive cooperative infrastructure sensing messages 46 based on cellular signals instead. In an embodiment, the cooperative infrastructure sensing messages 46 related to the specific remote vehicle 42 may be determined by another vehicle (not shown) within the surrounding environment 26 instead of the remote infrastructure 44.

In embodiments, the specific remote vehicle 42 does not include vehicle-to-vehicle (V2V) communication capabilities. Thus, the cooperative infrastructure sensing messages 46 sent to the controller 20 of the vehicle 10 only indicates information related to a position and dynamics of the specific remote vehicle 42, and not a context and an intent of the specific remote vehicle 42. The context of the specific remote vehicle 42 indicates a travel history, and the intent predicts an intended path of the specific remote vehicle 42. As explained below, the disclosed communication system 12 determines the context and the intent of the specific remote vehicle 42 based on the position and dynamics indicated by the cooperative infrastructure sensing messages 46.

Figure 3:
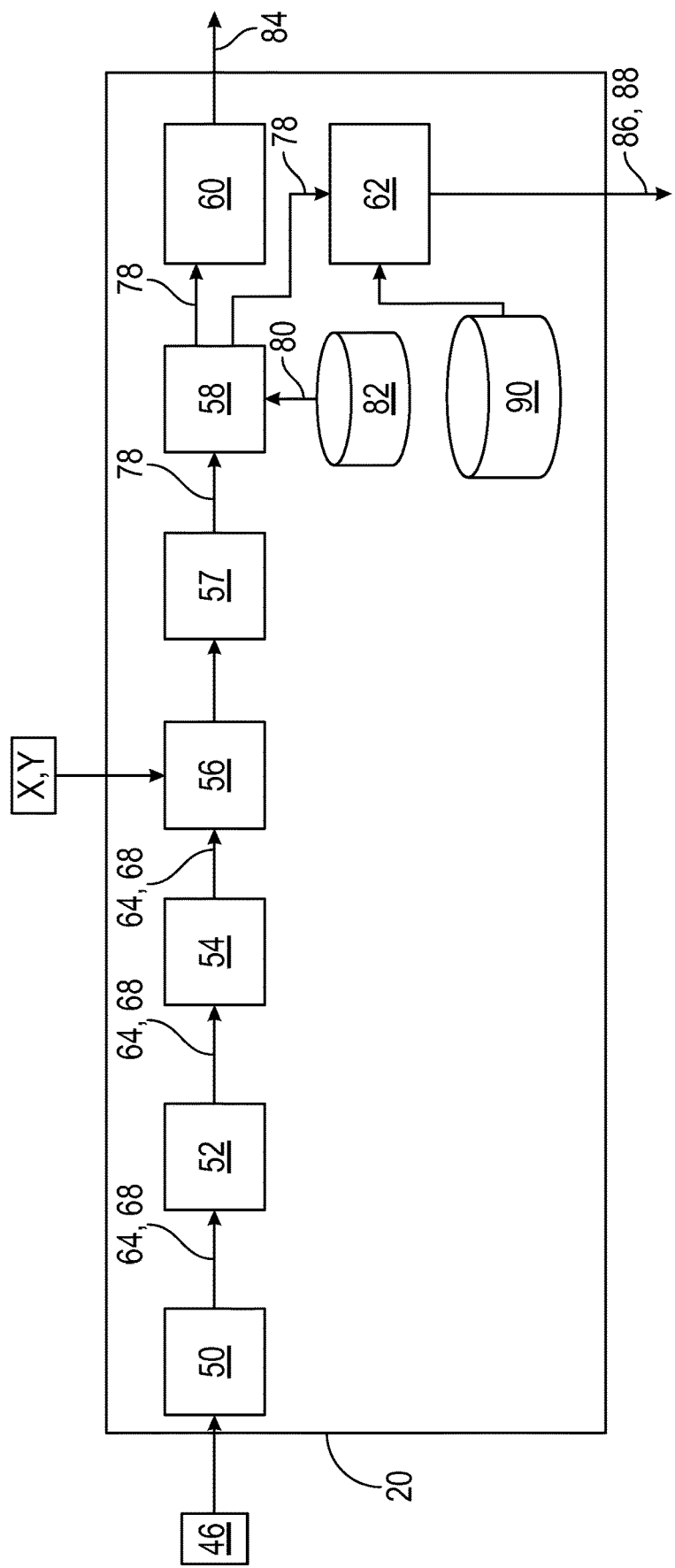
FIG. 3 is a block diagram of a controller that is part of the communication system shown in FIG. 1, according to an exemplary embodiment.

FIG. 3 is a block diagram of the communication system 12. In the embodiment as shown in FIG. 2, the controller 20 includes a tracking and detection module 50, a coordinate transform module 52, a raw position module 54, a noise modeling module 56, an object detection module 57, a localization and map matching module 58, a context module 60, and a confidence and intent module 62, however, it is to be appreciated that the communication system 12 may be a distributed computing system that determines the context and intent of the specific remote vehicle 42 upon one or more controllers of the remote infrastructure 44 shown in FIG. 2. The tracking and detection module 50 of the controller 20 receives the cooperative infrastructure sensing messages 46 related to the specific remote vehicle 42 (FIG. 2), which include sensed perception data from a perception device such as an infrastructure camera. The tracking and detection module 50 determines a plurality of vehicle parameters 68 related to the specific remote vehicle 42 based on the cooperative infrastructure sensing messages 46. In an embodiment, the plurality of vehicle parameters 68 indicate a position, detection time, dimensions, identifier, speed, location geometry, and heading of the specific remote vehicle 42 in addition to image data 64 collected by the remote infrastructure 44 (i.e., the red light cameras seen in FIG. 2), however, it is to be appreciated that other information may be included as well. In one embodiment, the image data 64 is collected by a single camera, and therefore depth perception is limited. However, it is to be appreciated that the image data 64 may be collected from multiple cameras as well. The plurality of vehicle parameters 68 are then sent to the coordinate transform module 52. The coordinate transform module 52 converts the position, which is expressed in camera or image frame coordinates, into global coordinates. The position, speed, location geometry, and heading is then sent to the raw position module 54. The raw position module 54 determines location information as well as speed, acceleration, and heading parameters of the specific remote vehicle 42

As explained below, the noise modeling module 56 determines noise associated with converting coordinates from the world coordinate system (also referred to as the GPS coordinate system) into image frame coordinates. The noise modeling module 56 receives the plurality of parameters 68 and detected pixel coordinates x, y related to the specific remote vehicle 42 and a plurality of world coordinate pairs X, Y representing a monitored area of the surrounding environment 26 (FIG. 2). Specifically, the world coordinate pairs X, Y indicate a latitude and a longitude of specific points located along a patch of roadway and are based on the world coordinate system. The noise modeling module 56 converts the plurality of coordinate pairs X, Y expressed based on the world (e.g., GPS) coordinate system into image frame coordinates based on a homography matrix. The homography matrix is a mapping between two planes, namely an image plane and a world coordinate plane (i.e., GPS coordinates). In an embodiment, the homography matrix is pre-computed and is stored in a memory of the controller 20.

Once the image frame coordinates have been determined, the noise modeling module 56 then performs homography noise modeling by determining noise associated with converting the world coordinate pairs X, Y into image frame coordinates. Specifically, the noise modeling module 56 then divides an image representing the monitored area of the surrounding environment 26 (FIG. 2) into a plurality of pixel bins. For example, the image may be divided into M×N pixel bins (such as 2×2 or 4×4). The noise modeling module 56 then determines how many of the world coordinates map to each pixel bin of the image. The noise modeling module 56 then determines a distance covariance map and a velocity covariance map for each pixel bin that is part of the image. The noise modeling module 56 determines the distance covariance map for each pixel bin of the image using distances between the world coordinates mapped to each pixel bin. The noise modeling module 56 determines the velocity covariance map for each pixel bin by using distances between the world coordinates that map to a specific pixel bin, divided by an inter-frame time.

Figure 4:
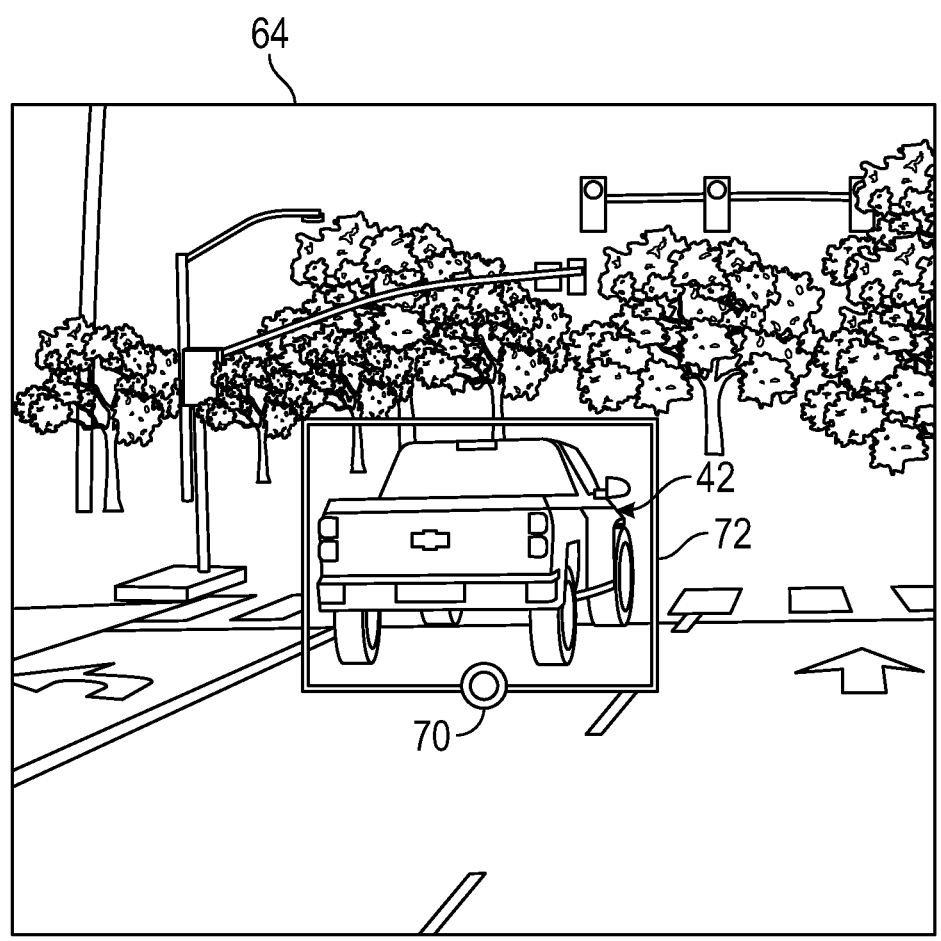
FIG. 4 is an exemplary illustration of image data rendering a representation of the specific remote vehicle that is part of the surrounding environment shown in FIG. 2, according to an exemplary embodiment.

FIG. 4 is an exemplary illustration of the image data 64 that is transmitted by the cooperative infrastructure sensing messages 46. The image data 64 renders a representation of the specific remote vehicle 42 that is part of the surrounding environment 26 (FIG. 2) of the host vehicle 10. Referring to FIGS. 3 and 4, the object detection module 57 executes an object detection algorithm to monitor the image data 64 that is part of the plurality of parameters 68 to detect the specific remote vehicle 42. For example, in one non-limiting embodiment, the object detection module 57 may execute a You Only Look Once (YOLO) algorithm to detect the specific remote vehicle 42 that is part of the image data 64. FIG. 4 illustrates the specific remote vehicle 42 as detected by the object detection module 57 as a detected object pixel 70. The noise modeling module 56 then matches the detected object pixel 70 with the velocity covariance map and the distance covariance map.

Continuing to refer to FIGS. 3 and 4, the noise modeling module 56 receives a plurality of stationary images of the specific remote vehicle 42 as input, and determines a noise associated with a bounding box 72. The bounding box 72 is a rectangle that bounds a detected object, which is the specific remote vehicle 42 located within the stationary images. The noise associated with the bounding box 72 is determined based on any available method such as, for example, an object detection algorithm. In embodiments, the noise associated with the bounding box 72 is expressed as a covariance matrix. The noise modeling module 56 then determines the pixel bins that are impacted by the noise associated with the bounding box 72. The noise modeling module 56 then calculates an average velocity covariance matrix and an average distance covariance matrix for each impacted pixel bin. When an object is detected, the noise modeling module 56 matches pixels belonging to the detected object with the velocity covariance map and the distance covariance map, and the world coordinates of the detected object and a matching velocity covariance map and a matching distance covariance map are sent to a Kalman Filter based state tracking module. The Kalman Filter based state tracking module then determines the noise associated with converting the world coordinate pairs X, Y into image frame coordinates. A Kalman filter then determines a plurality of error resilient vehicle parameters 78 related to the specific remote vehicle 42 based on the noise associated with converting the world coordinate pairs X, Y into image frame coordinates. In an embodiment, the plurality of error resilient vehicle parameters 78 indicate a position, speed, and heading of the specific remote vehicle 42.

Turning back to FIG. 3, the localization and map matching module 58 receives the plurality of error resilient vehicle parameters 78 related to the specific remote vehicle 42 as well as map data 80 from a road geometry database 82, and determines possible maneuvers, possible egress lanes for the specific remote vehicle 42, and a speed limit based on the input. Specifically, the map data 80 most relevant to a direction of travel for the specific remote vehicle 42 may be selected. The most relevant map data is based on a direction of travel of the specific remote vehicle 42. For example, if the specific remote vehicle 42 is traveling from the North to the South, then the map data 80 related to road geometry running from the North to the South may be used. The map data 80 indicates information related to the lanes of travel of a roadway that the specific remote vehicle 42 is traveling along. For example, the map data 80 may indicate a number of lanes and types of lanes related to the roadway the specific remote vehicle 42 is travelling along. For example, the map data 80 may indicate the roadway includes three lanes, where the type of lanes include a left lane, a center lane, and a right lane.

The map data 80 further indicates attributes for each lane included in a roadway. The attributes indicate allowed maneuvers as well as connecting lanes. Maneuvers may refer to an allowed direction of travel such as allowed turns, through-only lanes, possible connecting lanes, starting point for a turn pocket lane, and speed limit. In the present example, the left lane may be a left turn only lane, the center lane is a through lane, and the right lane is a right turn only lane. The connecting lanes refer to the lanes that a vehicle may travel along after making a maneuver. The localization and map matching module 58 associates the specific remote vehicle 42 with a specific lane of travel of the roadway based on the map data 80. The localization and map matching module 58 then determines the possible maneuvers, the possible egress lanes for the specific remote vehicle 42, and the speed limit for the specific remote vehicle 42 for the specific lane of travel based on the map data 80.

The localization and map matching module 58 sends the plurality of error resilient vehicle parameters 78, the possible maneuvers, the possible egress lanes for the specific remote vehicle 42, and the speed limit related to the specific remote vehicle 42 to the context module 60. The context module 60 then determines the context 84 of the specific remote vehicle 42 based on the plurality of error resilient vehicle parameters 78, the possible maneuvers, the possible egress lanes for the specific remote vehicle 42, and the speed limit related to the specific remote vehicle 42. The context 84 represents the travel history of the specific remote vehicle 62, and in an embodiment is expressed as a travel history distance.

Figure 5A:
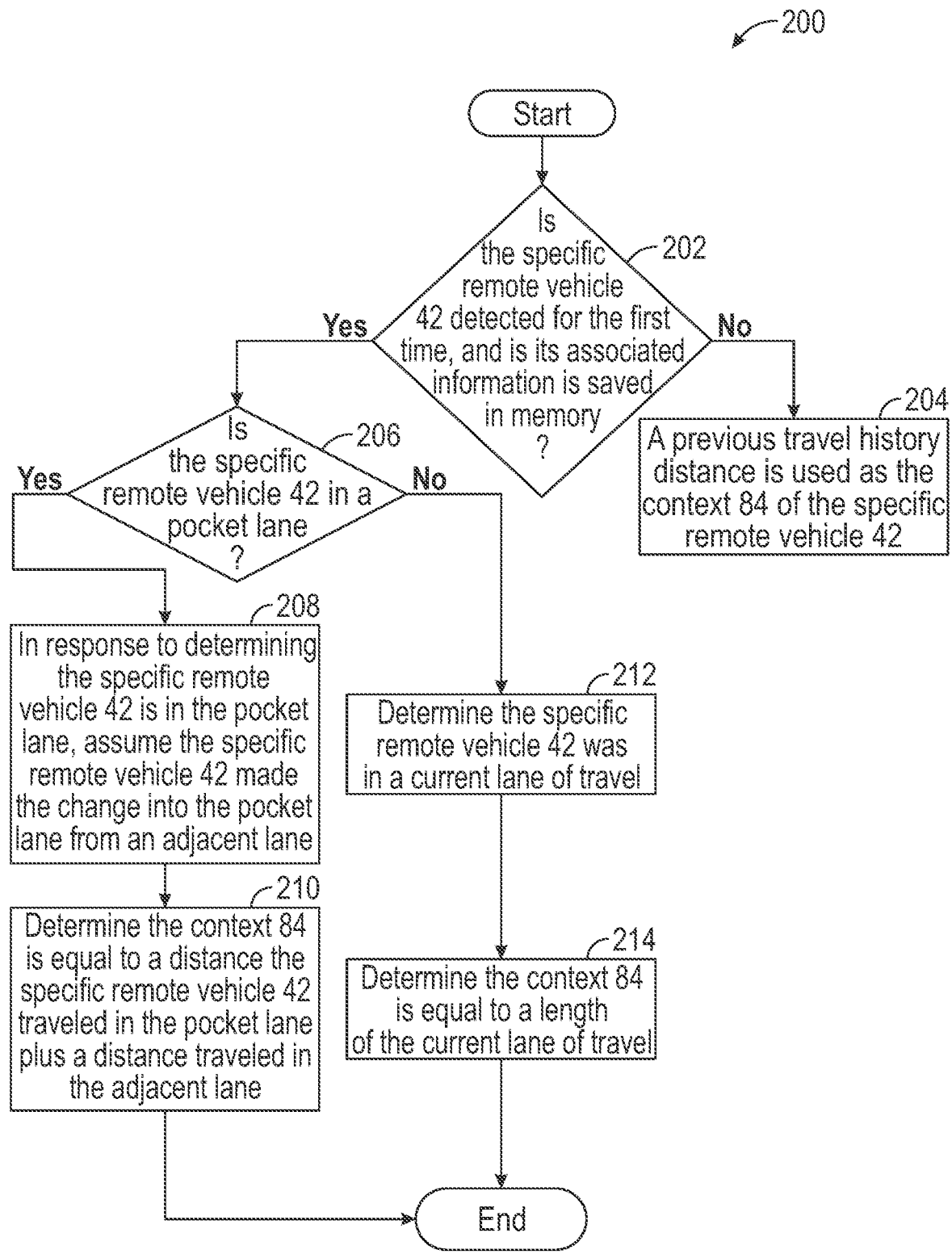
FIG. 5A is a process flow diagram illustrating a method for determining a context of the specific remote vehicle, according to an exemplary embodiment.

FIG. 5A is a process flow diagram illustrating a method 200 for determining the travel history distance, or context 84, of the specific remote vehicle 42. Referring specifically to FIGS. 3 and 5, the method 200 may begin at decision block 202. In decision block 202, the context module 60 checks a memory of the controller 20 to determine if the specific remote vehicle 42 is detected for the first time, and its associated information is saved in memory. If the answer is yes, then the method 200 proceeds to block 204, and a previous travel history distance is used as the context 84 of the specific remote vehicle 42. The method 200 may then terminate. However, if the answer is no, then the method 200 may proceed to decision block 206.

In decision block 206, the context module 60 determines if the specific remote vehicle 42 is in a pocket lane. If the specific remote vehicle 42 is in a pocket lane, then the method 200 may proceed to block 208. In block 208, in response to determining the specific remote vehicle 42 is in the pocket lane, assume the specific remote vehicle 42 made the change into the pocket lane from an adjacent lane. The method 200 may then proceed to block 210. In block 210, the context module 60 determines the context 84 is equal to a distance the specific remote vehicle 42 traveled in the pocket lane plus a distance traveled in the adjacent lane. The method 200 may then terminate.

In the event the context module 60 determines the specific remote vehicle 42 was is not in a pocket lane, the method 200 may then proceed to block 212. In block 212, the context module 60 determines the specific remote vehicle 42 was in a current lane of travel. The method 200 may then proceed to block 214. In block 214, the context module 60 determines the context 84 is equal to a length of the current lane of travel. The method 200 may then terminate. Therefore, the context module 60 determines when the specific remote vehicle 42 is in a pocket lane, and in response to determining the specific remote vehicle 42 being in the pocket lane, set the context 84 as equal to the distance the specific remote vehicle 42 traveled in the pocket lane plus the distance traveled in the adjacent lane. However, in response to determining the specific remote vehicle 42 not being in the pocket lane, the context module 60 sets the context 84 as equal to the length of the current lane of travel. It is to be appreciated that the context 84 may be limited to a predetermined threshold that may be determined based on the context module 60.

Referring back to FIG. 3, the confidence and intent module 62 receives the plurality of error resilient vehicle parameters 78, the possible maneuvers, the possible egress lanes for the specific remote vehicle 42, and the speed limit related to the specific remote vehicle 42 from the localization and map matching module 58, and determines a confidence level 86 and the intent 88 of the specific remote vehicle 42. The confidence level 86 indicates a probability that the intent 88 calculated by the confidence and intent module 62 is accurate. In an embodiment, the confidence level 86 is measured in terms of percentages, which may be mapped to high, medium, and low levels. As seen in FIG. 3, the confidence and intent module 62 receives cached location information 92 from a vehicle database 90, where the cached location information saves data related to previous calculations for the confidence level.

Figure 5B:
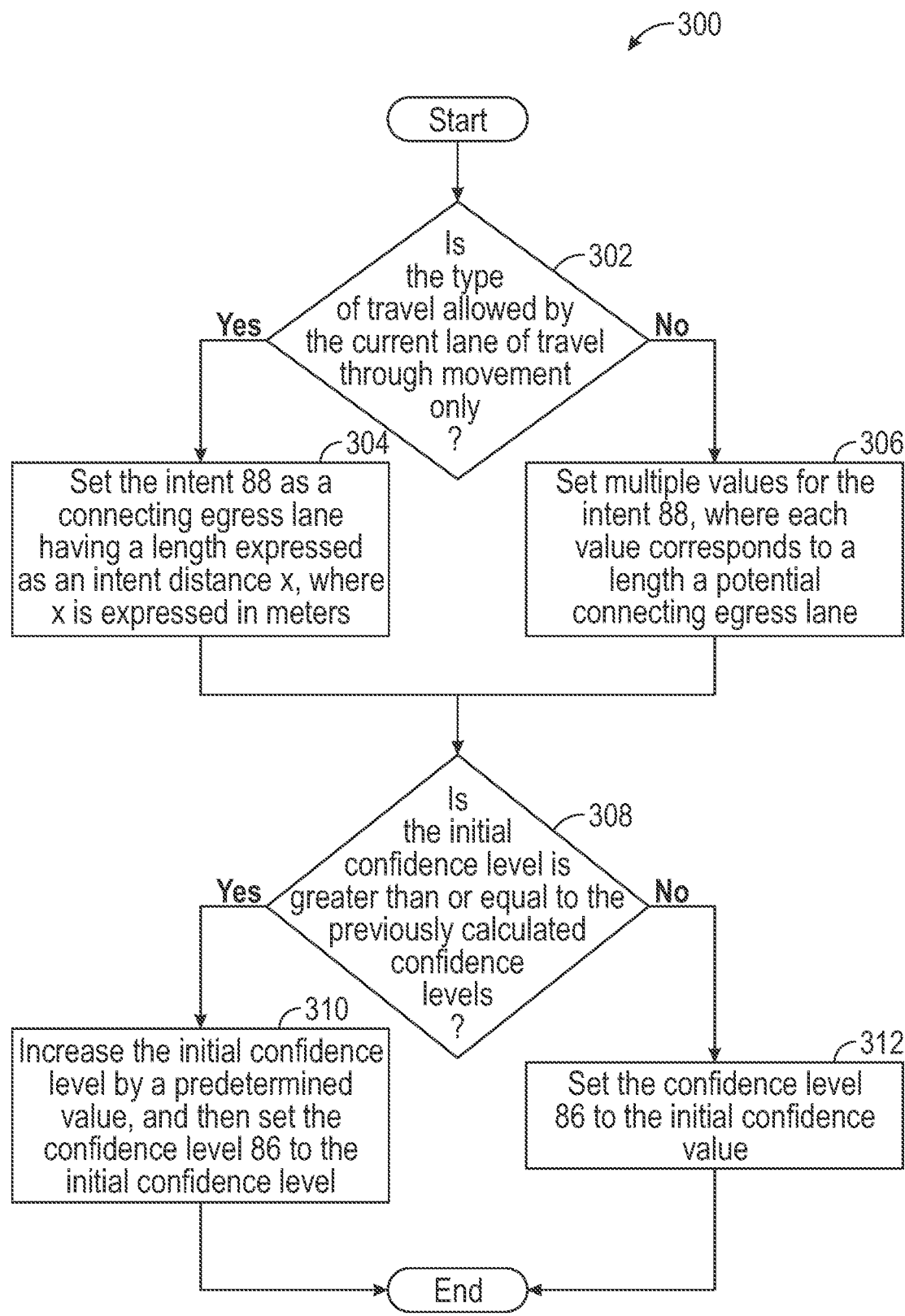
FIG. 5B is a process flow diagram illustrating a method for determining an intent of the specific remote vehicle, according to an exemplary embodiment.

FIG. 5B is a process flow diagram illustrating a method 300 for determining the confidence level 86 and the intent 88 of the specific remote vehicle 42. Referring to FIGS. 3 and 5B, the method 300 may begin at decision block 302. In decision block 302, the confidence and intent module 62 determines a type of travel allowed by the current lane of travel for the specific remote vehicle 42, where the type of travel includes through movement only and turns allowed. In response to determining the type of travel allowed by the current lane of travel is through movement only, then the method 300 may proceed to block 304.

In block 304, the confidence and intent module 62 sets the intent 88 as a connecting egress lane having a length expressed as an intent distance x, where x is expressed in meters. The intent distance is a distance measured along a travel path for the specific remote vehicle 42, which is measured from a current position to the start of a predicted egress lane, plus a predetermined distance in the egress lane. It is to be appreciated that the intent distance includes a minimum length, which is specified a calibration parameter. The confidence and intent module 62 also sets an initial confidence level of the intent 88 as high, since it is clear that the specific remote vehicle 42 would normally continue to travel in the connecting egress lane since no turns are allowed. The method 300 may then proceed to decision block 308, which is described below.

Returning back to decision block 302, in response to determining the current lane of travel for the specific remote vehicle 42 allows for turns, then the method 300 may proceed to block 306. In block 306, the confidence and intent module 62 sets multiple values for the intent 88, where each value corresponds to a length a potential connecting egress lane. The lengths are expressed as an intent distance x(i), where x is expressed in meters and i represents the number of potential connecting egress lanes. The confidence and intent module 62 also sets an initial confidence level of the intent 88 for each potential egress lane based on vehicle dynamics and any traffic light. For example, in an embodiment, the initial confidence level is a function of speed, acceleration, and the traffic light. Traffic lights may affect confidence levels in specific situations. For example, if a left turn lane currently has a red light but a straight lane has a green light, and if the specific remote vehicle 42 slows down when approaching the two traffic lights, then it is highly likely that the specific remote vehicle 42 plan to turn left. However, if the specific remote vehicle 42 does not slow down, then it is highly likely that the specific remote vehicle 42 plans to travel straight. The method 300 may then proceed to decision block 308.

In decision block 308, then compares the initial confidence level determined at either block 304 or 306 with the cached location information 92 from the vehicle database 90, where the cached location information indicates previously calculated confidence levels. The confidence and intent module 62 compares the initial confidence level with the previously calculated confidence levels. In response to determining the initial confidence level is greater than or equal to the previously calculated confidence levels, then the method 300 proceeds to block 310. However, in response to determining the initial confidence level is equal to or less than the previously calculated confidence levels, then the method 300 proceeds to block 312.

In block 310, the confidence and intent module 62 increases the initial confidence level by a predetermined value, and then sets the confidence level 86 to the initial confidence level. The method 200 may then terminate.

In block 312, the confidence and intent module 62 sets the confidence level 86 to the initial confidence value. The method 200 may then terminate.

Figure 6:
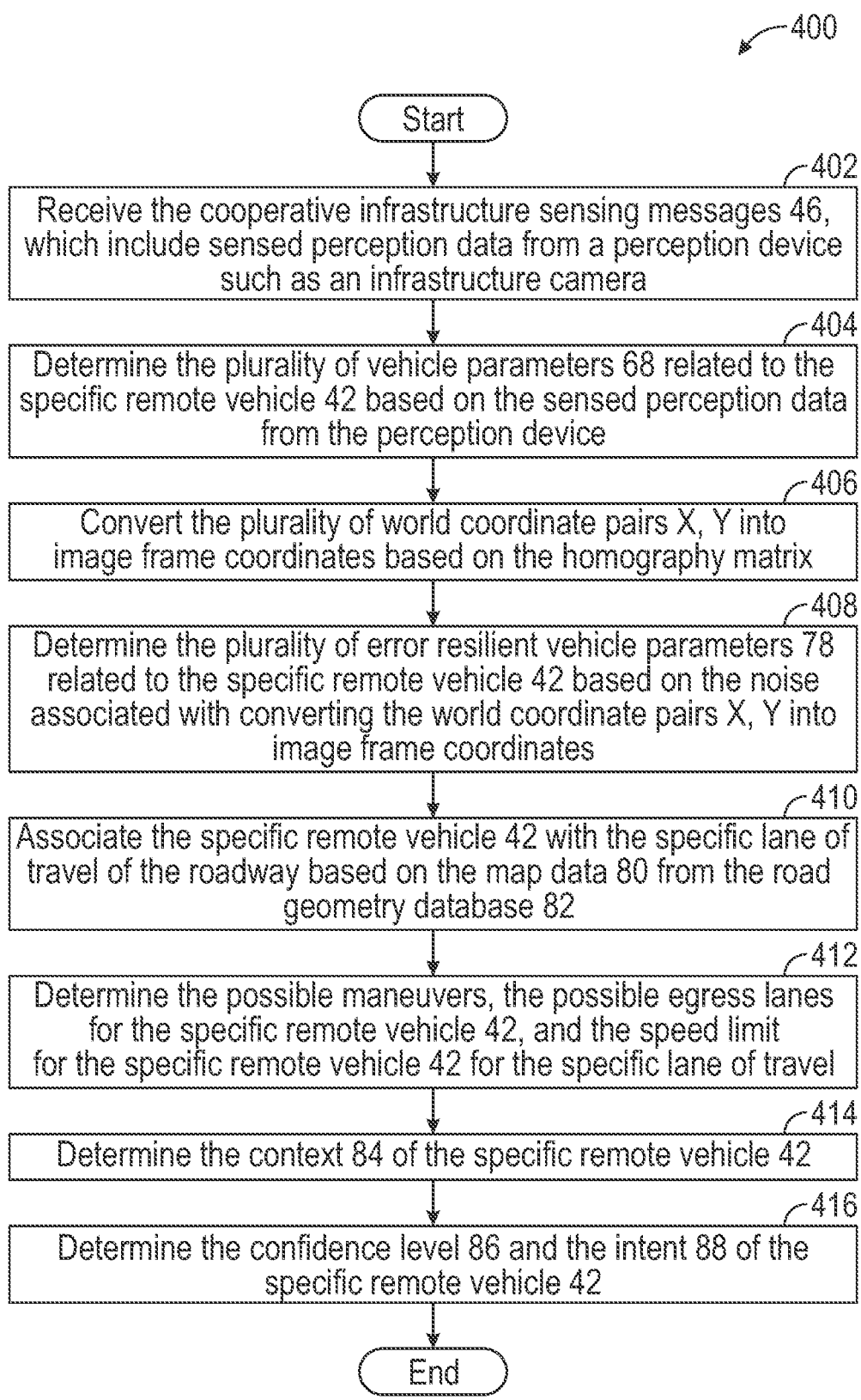
FIG. 6 is a process flow diagram illustrating a method for determining the context and the intent for the specific remote vehicle, according to an exemplary embodiment.

FIG. 6 is a process flow diagram illustrating a method 400 for determining the context 84 and the intent 88 for the specific remote vehicle 42 shown in FIG. 2. Referring generally to FIGS. 1, 2, 3, and 6, the method 200 may begin at block 402. In block 402, the tracking and detection module 50 receives the cooperative infrastructure sensing messages 46, which include sensed perception data from a perception device such as an infrastructure camera. The method 400 may then proceed to block 404.

In block 404, the tracking and detection module 50 of the controller 20 determines the plurality of vehicle parameters 68 related to the specific remote vehicle 42 based on the sensed perception data from the perception device. As mentioned above, the plurality of vehicle parameters 68 indicate a position, location geometry, detection time, and identifier of the specific remote vehicle 42 in addition to image data 64 collected by the remote infrastructure 44 (i.e., the red light cameras seen in FIG. 2). The method 400 may then proceed to block 406.

In block 406, the noise modeling module 56 of the controller 20 converts the plurality of world coordinate pairs X, Y (seen in FIG. 3) into image frame coordinates based on the homography matrix mentioned above. The method 400 may then proceed to block 408.

In block 408, the Kalman filter determines the plurality of error resilient vehicle parameters 78 related to the specific remote vehicle 42 based on the noise associated with converting the world coordinate pairs X, Y into image frame coordinates. It is to be appreciated that in some embodiments, block 408 may be omitted, and instead the plurality of vehicle parameters 68, which have not been adjusted based on the noise associated with converting the world coordinate pairs X, Y into image frame coordinates. The method 400 may then proceed to block 410.

In block 410, the localization and map matching module 58 of the controller 20 associates the specific remote vehicle 42 with the specific lane of travel of the roadway based on the map data 80 from the road geometry database 82. The method 400 may then proceed to block 412.

In block 412, the localization and map matching module 58 of the controller 20 determines the possible maneuvers, the possible egress lanes for the specific remote vehicle 42, and the speed limit for the specific remote vehicle 42 for the specific lane of travel based on the map data 80 from the road geometry database 82. The method 400 may then proceed to block 414.

In block 414, the context module 60 of the controller 20 determines the context 84 of the specific remote vehicle 42 based on the plurality of error resilient vehicle parameters 78, the possible maneuvers, the possible egress lanes for the specific remote vehicle 42, and the speed limit related to the specific remote vehicle 42. The method 200 may then proceed to block 416.

In block 416, the confidence and intent module 62 of the controller 20 determines the confidence level 86 and the intent 88 of the specific remote vehicle 42 based on the plurality of error resilient vehicle parameters 78, the possible maneuvers, the possible egress lanes for the specific remote vehicle 42, and the speed limit related to the specific remote vehicle 42. The method 400 may then terminate.

Referring generally to the figures, the disclosed communication system provides various technical effects and benefits. Specifically, the communication system provides an approach for determining a context and an intent for a remotely located vehicle when none is available based on presently available information.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A communication system that determines a context and an intent of a specific remote vehicle located in a surrounding environment of a host vehicle, the communication system comprising:
   one or more controllers for receiving sensed perception data including sensed perception data related to the specific remote vehicle, wherein the specific remote vehicle does not transmit the context and the intent of the specific remote vehicle to the host vehicle, and wherein the one or more controllers execute instructions to:
   determine a plurality of vehicle parameters related to the specific remote vehicle based on the sensed perception data;
   associate the specific remote vehicle with a specific lane of travel of a roadway based on map data, wherein the map data indicates information related to lanes of travel of the roadway that the specific remote vehicle is traveling along;
   determine possible maneuvers, possible egress lanes, and a speed limit for the specific remote vehicle for the specific lane of travel based on the map data;
   determine the context of the specific remote vehicle based on a plurality of error resilient vehicle parameters, the possible maneuvers, the possible egress lanes for the specific remote vehicle, and the speed limit related to the specific remote vehicle;
   determine the intent of the specific remote vehicle based on the plurality of error resilient vehicle parameters, the possible maneuvers, the possible egress lanes for the specific remote vehicle, and the speed limit related to the specific remote vehicle;
   convert a plurality of coordinate pairs based on a world coordinate system into image frame coordinates for homography noise modeling based on a homography matrix, wherein the coordinate pairs represent a monitored area of the surrounding environment of the host vehicle; and
   determine, by a Kalman filter, the plurality of error resilient vehicle parameters related to the specific remote vehicle based on a noise associated with converting the coordinate pairs based on the world coordinate system into image frame coordinates.

2. The communication system of claim 1, wherein the one or more controllers execute instructions to perform the homography noise modeling by the following:
   divide an image representing the monitored area of the surrounding environment into a plurality of pixel bins;
   determine how many of the coordinate pairs based on the world coordinate system map to each pixel bin of the image; and
   determine a distance covariance map and a velocity covariance map based for each pixel bin that is part of the image.

3. The communication system of claim 2, wherein the one or more controllers execute instructions to:
   render image data that is a representation of the specific remote vehicle;
   execute an object detection algorithm to detect the specific remote vehicle within the image data, wherein the specific remote vehicle that is detected is a detected object pixel; and
   match the detected object pixel with the velocity covariance map and the distance covariance map.

4. The communication system of claim 3, wherein the one or more controllers execute instructions to:
   determine a noise associated with a bounding box based on a plurality of stationary images of the specific remote vehicle;
   determine the pixel bins that are impacted by the noise associated with the bounding box;
   calculate an average velocity covariance matrix and an average distance covariance matrix for each impacted pixel bin;
   match pixels belonging to the detected object with the velocity covariance map and the distance covariance map; and
   send the world coordinates of the detected object and a matching velocity covariance and a matching distance covariance to a Kalman Filter based state tracking module.

5. The communication system of claim 1, wherein the one or more controllers execute instructions to:
   determine when the specific remote vehicle is in a pocket lane;
   in response to determining the specific remote vehicle being in the pocket lane, set the context as equal to a distance the specific remote vehicle traveled in the pocket lane plus a distance traveled in an adjacent lane; and
   in response to determining the specific remote vehicle is not in the pocket lane, set the context as equal to a length of a current lane of travel, wherein the length of the current lane of travel is based on a distance the specific remote vehicle has traveled within the current lane.

6. The communication system of claim 1, wherein the one or more controllers execute instructions to:
determine a type of travel allowed by a current lane of travel for the specific remote vehicle, wherein the type of travel includes through movement only; and
in response to determining the type of travel allowed by the current lane of travel is through movement only, set the intent as a connecting egress lane having a length expressed as an intent distance.

7. The communication system of claim 1, wherein the one or more controllers execute instructions to:
determine a type of travel allowed by a current lane of travel for the specific remote vehicle, wherein the type of travel includes through movement only; and
in response to determining the current lane of travel for the specific remote vehicle allows for turns, sets multiple values for the intent, wherein each value corresponds to a length a potential connecting egress lane.

8. The communication system of claim 1, wherein the one or more controllers execute instructions to:
determine a confidence level indicating a probability that the intent is accurate.

9. The communication system of claim 1, wherein the plurality of vehicle parameters indicate a position, speed, location geometry, and heading of the specific remote vehicle.

10. The communication system of claim 1, wherein the sensed perception data is collected by an infrastructure camera.

11. The communication system of claim 1, wherein the context of the specific remote vehicle indicates a travel history of the specific remote vehicle.

12. The communication system of claim 1, wherein the intent of the specific remote vehicle predicts an intended path of the specific remote vehicle.

13. The communication system of claim 1, wherein the specific remote vehicle does not include vehicle-to-vehicle (V2V) communication capabilities.

14. A method for determining a context and an intent of a specific remote vehicle located in a surrounding environment of a host vehicle, the method comprising:
receiving, by one or more controllers, sensed perception related to the specific remote vehicle, wherein the specific remote vehicle does not transmit the context and the intent of the specific remote vehicle to the host vehicle;
determining, by the one or more controllers, a plurality of vehicle parameters related to the specific remote vehicle based on the sensed perception data;
associating the specific remote vehicle with a specific lane of travel of a roadway based on map data, wherein the map data indicates information related to lanes of travel of the roadway that the specific remote vehicle is traveling along;
determining possible maneuvers, possible egress lanes, and a speed limit for the specific remote vehicle for the specific lane of travel based on the map data;
determining the context of the specific remote vehicle based on a plurality of error resilient vehicle parameters, the possible maneuvers, the possible egress lanes for the specific remote vehicle, and the speed limit related to the specific remote vehicle;
determining the intent of the specific remote vehicle based on the plurality of error resilient vehicle parameters, the possible maneuvers, the possible egress lanes for the specific remote vehicle, and the speed limit related to the specific remote vehicle;
converting a plurality of coordinate pairs based on a world coordinate system into image frame coordinates for homography noise modeling based on a homography matrix, wherein the coordinate pairs represent a monitored area of the surrounding environment of the host vehicle; and
determining, by a Kalman filter, a plurality of error resilient vehicle parameters related to the specific remote vehicle based on a noise associated with converting the coordinate pairs based on the world coordinate system into image frame coordinates.

15. The method of claim 14, further comprising performing the homography noise modeling by:
dividing an image representing the monitored area of the surrounding environment into a plurality of pixel bins;
determining how many of coordinate pairs based on the world coordinate system map to each pixel bin of the image; and
determining a distance covariance map and a velocity covariance map based for each pixel bin that is part of the image.

16. The method of claim 15, further comprising:
rendering image data that is a representation of the specific remote vehicle;
executing an object detection algorithm to detect the specific remote vehicle within the image data, wherein the specific remote vehicle that is detected is a detected object pixel; and
matching the detected object pixel with the velocity covariance map and the distance covariance map.

17. The method of claim 16, further comprising:
determining a noise associated with a bounding box based on a plurality of stationary images of the specific remote vehicle;
determining the pixel bins that are impacted by the noise associated with the bounding box;
calculating an average velocity covariance matrix and an average distance covariance matrix for each impacted pixel bin;
matching pixels belonging to the detected object with the velocity covariance map and the distance covariance map; and
sending the world coordinates of the detected object and a matching velocity covariance and a matching distance covariance to a Kalman Filter based state tracking module.

18. The method of claim 14, further comprising:
determining when the specific remote vehicle is in a pocket lane;
in response to determining the specific remote vehicle being in the pocket lane, setting the context as equal to a distance the specific remote vehicle traveled in the pocket lane plus a distance traveled in an adjacent lane; and
in response to determining the specific remote vehicle is not in the pocket lane, setting the context as equal to a length of a current lane of travel, wherein the length of the current lane of travel is based on a distance the specific remote vehicle has traveled within the current lane.

19. The method of claim 14, further comprising:
determining a type of travel allowed by a current lane of travel for the specific remote vehicle, wherein the type of travel includes through movement only; and
in response to determining the type of travel allowed by the current lane of travel is through movement only, setting the intent as a connecting egress lane having a length expressed as an intent distance.

20. The method of claim 14, further comprising:
determining a type of travel allowed by a current lane of travel for the specific remote vehicle, wherein the type of travel includes through movement only; and
in response to determining the current lane of travel for the specific remote vehicle allows for turns, setting multiple values for the intent, wherein each value corresponds to a length a potential connecting egress lane.

\* \* \* \* \*